United States Patent [19]

Gyor

[11] Patent Number: 5,564,660
[45] Date of Patent: Oct. 15, 1996

[54] SUPPORT FRAME ASSEMBLY FOR PLASTIC BAGS

[76] Inventor: Emoke A. Gyor, 34 Woodland Rd., Brookside, N.J. 07926

[21] Appl. No.: 305,011

[22] Filed: Sep. 13, 1994

[51] Int. Cl.[6] ............................................. B65B 67/04
[52] U.S. Cl. ............................. 248/97; 403/241; 403/263
[58] Field of Search .................................... 248/95, 97, 99, 248/100, 101, 98, 150, 167; 220/404; 141/314, 391; 403/263, 241

[56] References Cited

U.S. PATENT DOCUMENTS

| | | | |
|---|---|---|---|
| 3,796,402 | 3/1974 | Trotta | 248/97 |
| 3,866,872 | 2/1975 | Burgess | 248/97 |
| 4,157,801 | 6/1979 | Elmer | 248/97 |
| 4,287,701 | 9/1981 | Washington | 248/99 X |
| 4,759,518 | 7/1988 | Yardas | 248/97 |
| 4,783,031 | 11/1988 | Ebentheuer | 248/97 |
| 4,889,300 | 12/1989 | Gibson et al. | 248/97 |
| 4,899,967 | 2/1990 | Johnson | 248/97 |
| 4,946,118 | 8/1990 | Hastings | 248/97 |

*Primary Examiner*—Ramon O. Ramirez
*Attorney, Agent, or Firm*—Arthur L. Lessler

[57] ABSTRACT

A portable frame having a lower horizontal base ring and an upper horizontal open support ring interconnected by vertical rods which engage threaded pressure couplings on the rings. The couplings of the support ring have outwardly facing grooves for receiving a removable open locking ring which engages portions of the upper end of a plastic bag draped over the support ring and couplings thereof, to wedge said portions between the locking ring and support ring couplings, so as to retain the plastic bag in position.

12 Claims, 8 Drawing Sheets

SUPPORT FRAME ASSEMBLY FOR PLASTIC BAGS

BACKGROUND OF THE INVENTION

This invention relates to a frame assembly for supporting bags to be filled.

While frames for holding plastic bags are known in the art, such frames are generally bulky and therefore difficult to transport; do not hold the bags securely; do not lend themselves to easy placement of empty bags thereon and removal of filled bags therefrom; and do not readily accommodate bags of different sizes.

Accordingly, an object of the present invention is to provide a frame assembly for supporting bags to be filled, which overcomes the aforementioned disadvantages of the prior art.

SUMMARY OF THE INVENTION

As herein described, there is provided a frame assembly for supporting bags to be filled. The assembly includes an open support ring and support means for supporting the support ring. At least one ring-receiving member is mounted to the support ring and has an outwardly facing ring-receiving groove. An open locking ring is adapted to engage a portion of a bag between the locking ring and ring-receiving members at the groove thereof, so as to retain the bag in position.

IN THE DRAWING

DETAILED DESCRIPTION

Figure 1:
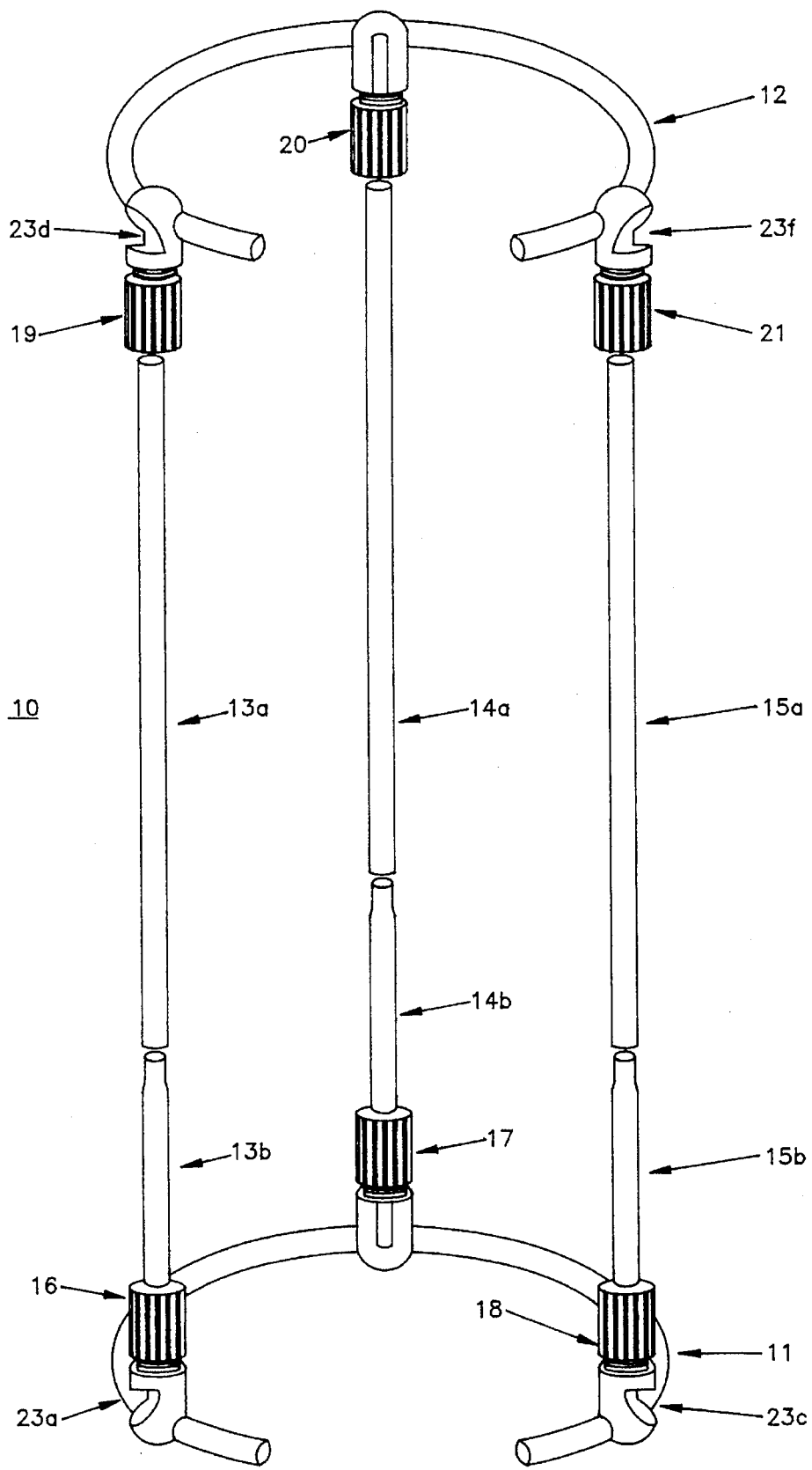
FIG. 1 is an exploded isometric view of a plastic bag frame which is part of a frame assembly according to a preferred embodiment of the present invention, without its locking ring.

As seen in FIG. 1, a portable frame 10 has a lower horizontal aluminum base ring 11 and an upper horizontal aluminum open support ring 12. The rings 11 and 12 are preferably identical for simplicity of manufacture, although it is not necessary that the base ring 11 be open.

First, second and third cylindrical aluminum rod assemblies 13a/13b, 14a/14b, and 15a/15b extend between the base ring 11 and the support ring 12. Each rod assembly has a relatively short lower rod (13b, 14b, 15b) with a smaller diameter upper end which inserts into a hollow in the lower end of an adjacent relatively long upper rod (13a, 14a, 15a). If a low height frame is desired, the frame may incorporate only the lower rods; and if an intermediate height frame is desired, the frame may incorporate only the upper rods.

The base ring 11 has three plastic couplings 16, 17, 18 rotatably mounted thereon and equidistant from each other. Similarly, The support ring 12 has three plastic couplings 19, 20, 21 rotatably mounted thereon and equidistant from each other. For simplicity of manufacture, all of the couplings 16 to 21 are identical to each other.

The first rod assembly 13a/13b has a lower end secured to the base ring 11 by coupling 16, and its upper end secured to the support ring 12 by coupling 19. Similarly, the second rod assembly 14a/14b has a lower end secured to the base ring 11 by coupling 17, and its upper end secured to the support ring 12 by coupling 20; and the third rod assembly 15a/15b has a lower end secured to the base ring 11 by coupling 18, and its upper end secured to the support ring 12 by coupling 21.

Figure 3:
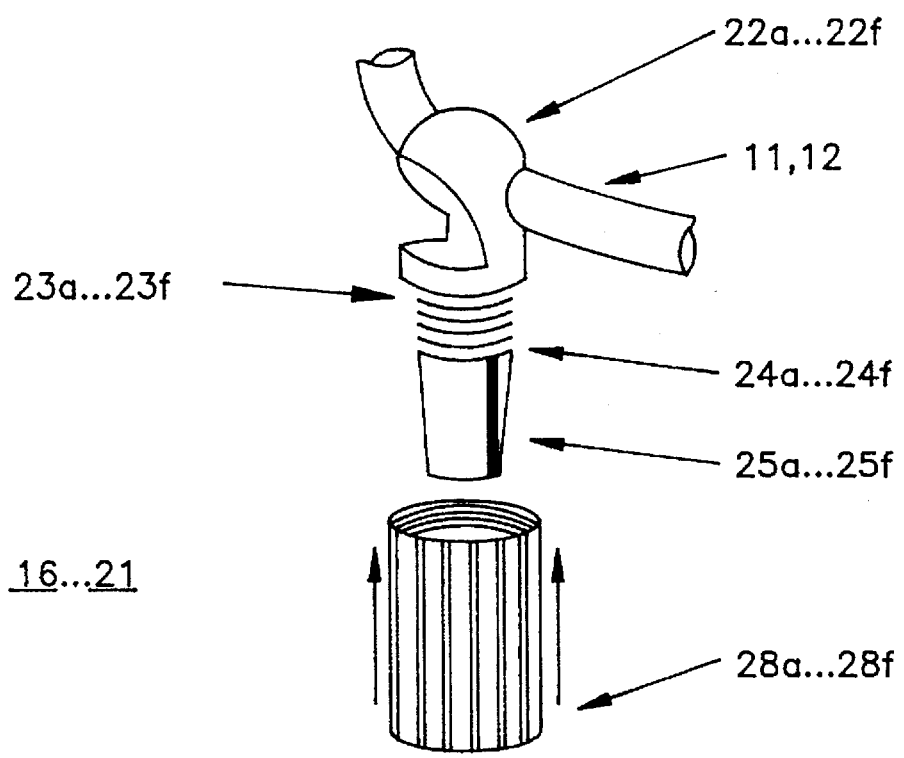
FIG. 3 is an exploded isometric view of one of the couplings of the frame shown in FIG. 1.
Figure 5:
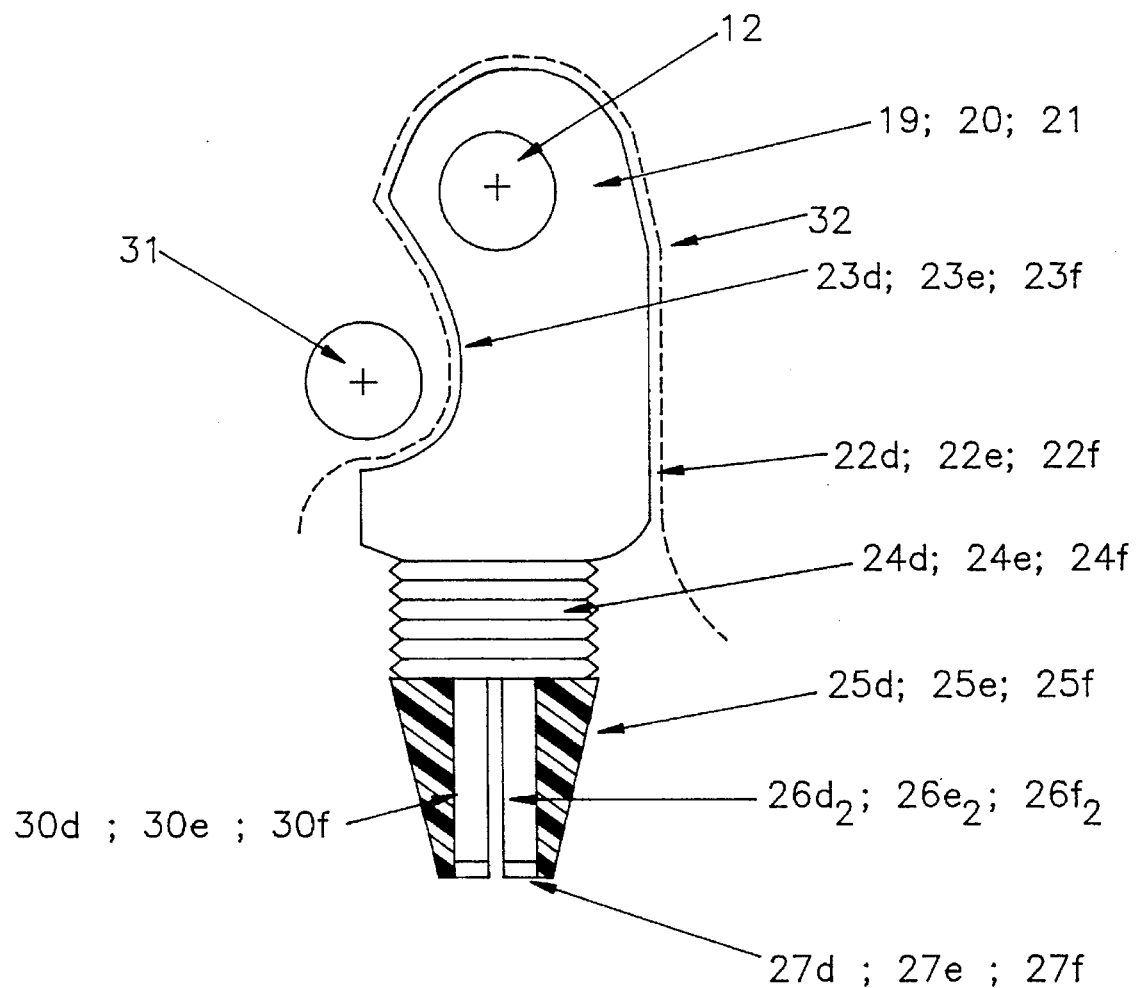
FIG. 5 is a cross-sectional view of part of a coupling which is mounted to the support ring of said frame, with a plastic bag held in place between the coupling and an adjacent part of the locking ring.

As best seen in FIGS. 3 and 5, the couplings 16 to 21 are generally cylindrical in shape and have first end portions 22a to 22f which encircle the corresponding ring, and have grooves 23a to 23f therein respectively. The grooves 23d to 23f of the couplings 19 to 21 mounted to the support ring 12 are oriented so as to face toward the outside of the support ring when the couplings are rotated so as to extend downward from the support ring.

Each of the couplings 16 to 21 has an externally threaded portion 24a . . . 24f extending from the first end portion 22a . . . 22f thereof, and a frustoconical portion 25a . . . 25f extending from the threaded portion, with two longitudinal slots 26a₁/26a₂ . . . 26f₁/26f₂ disposed opposite each other.

The frustoconical portion 25a . . . 25f of each coupling constitutes part of a pressure fitting, and has an open end 27a . . . 27f with a cylindrical hole therein having a diameter very slightly larger than the outer diameter of the adjacent portion of the corresponding rod assembly 13a/13b, 14a/14b, 15a/15b; so that an end of the rod assembly extends into and closely fits within the cylindrical interior of the frustoconical part of the coupling. The slots 26a₁/26a₂ . . . 26f₁/26f₂ of the couplings permit the frustoconical portions thereof to be deflected by the conical tapered interior surface of the hollow cylindrical nut part 28a . . . 28f (see FIG. 3) of the pressure fitting, so that the cylindrical inner surface 30a . . . 30f of the frustoconical portion tightly grips the adjacent portion of a rod assembly end when the internally threaded portion 28a . . . 28f of the nut part is screwed (by hand) onto the externally threaded portion 24a . . . 24f of the first end portion of the coupling.

Figure 2A:
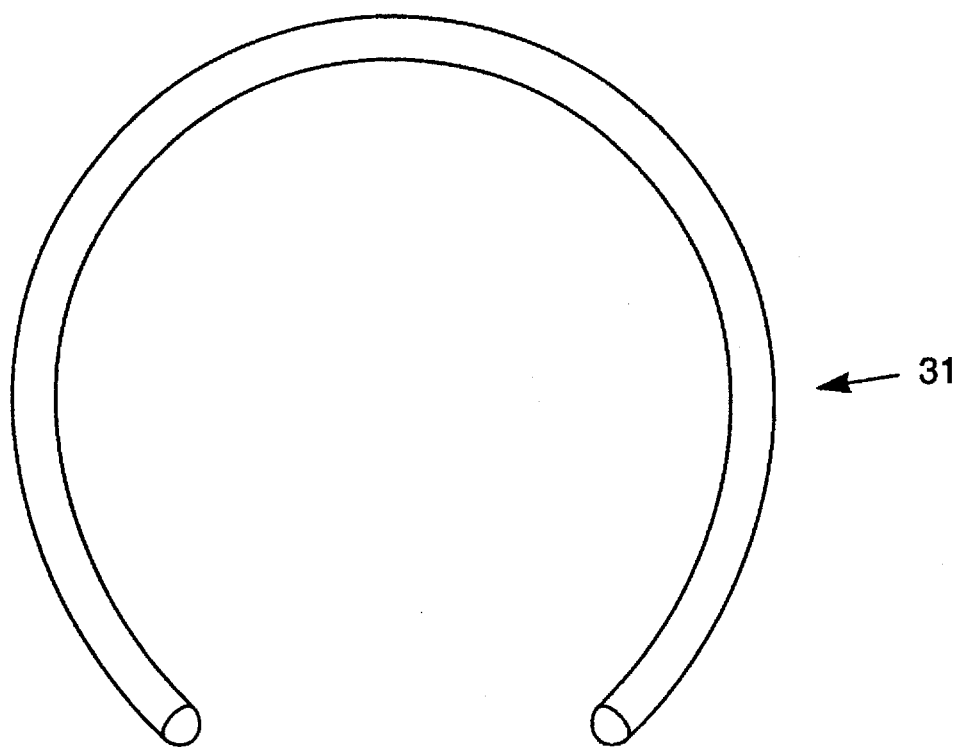
FIG. 2A is an isometric view of a locking ring for use with the frame shown in FIG. 1.
Figure 2B:
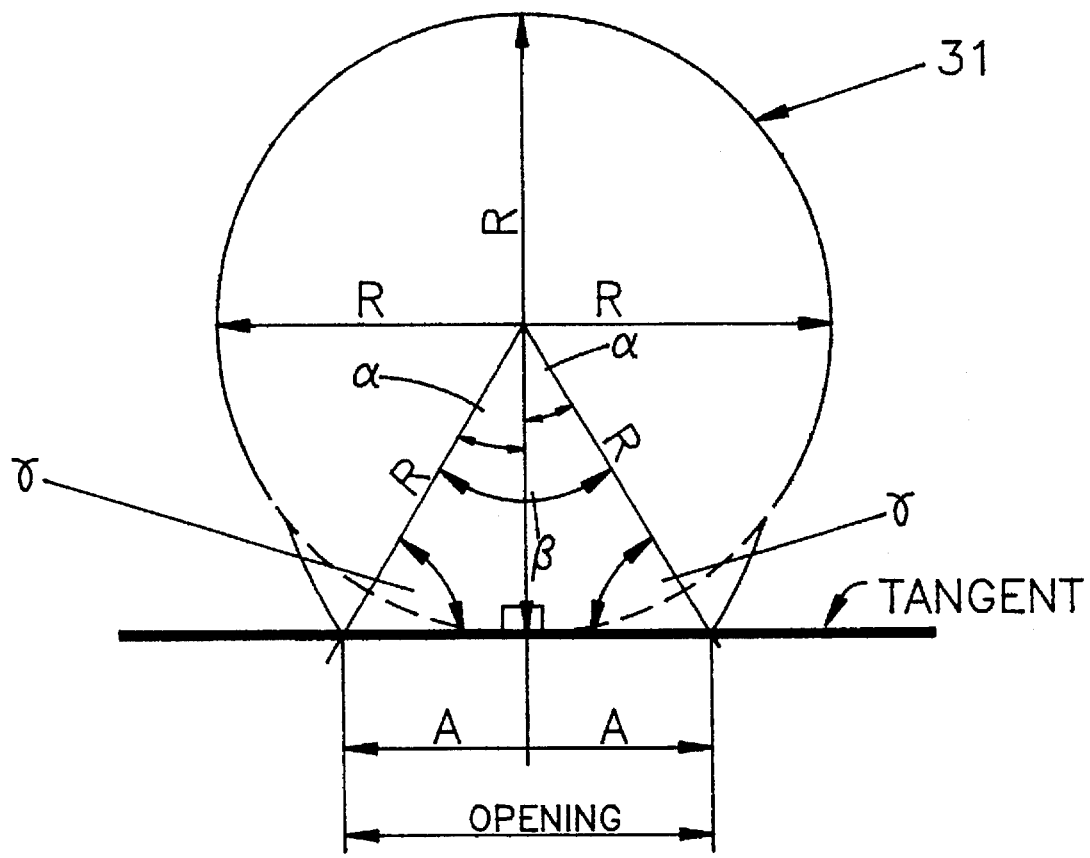
FIG. 2B is a schematic plan view of said locking ring, more specifically showing its shape.
Figure 4A:
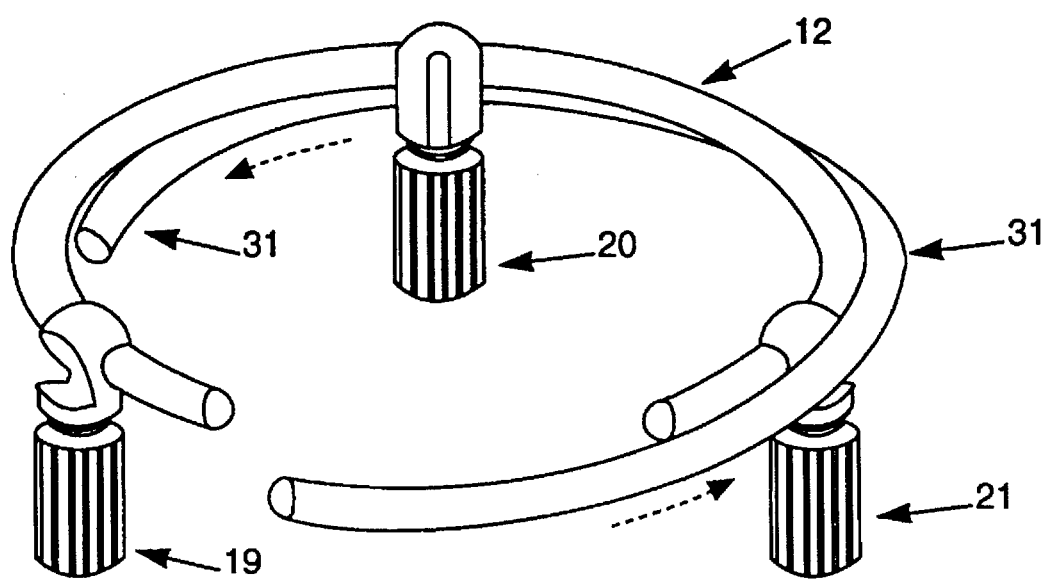
FIG. 4A is an isometric view of the support ring and locking ring of said frame, with the locking ring in an intermediate stage of installation on couplings mounted on the support ring.
Figure 4B:
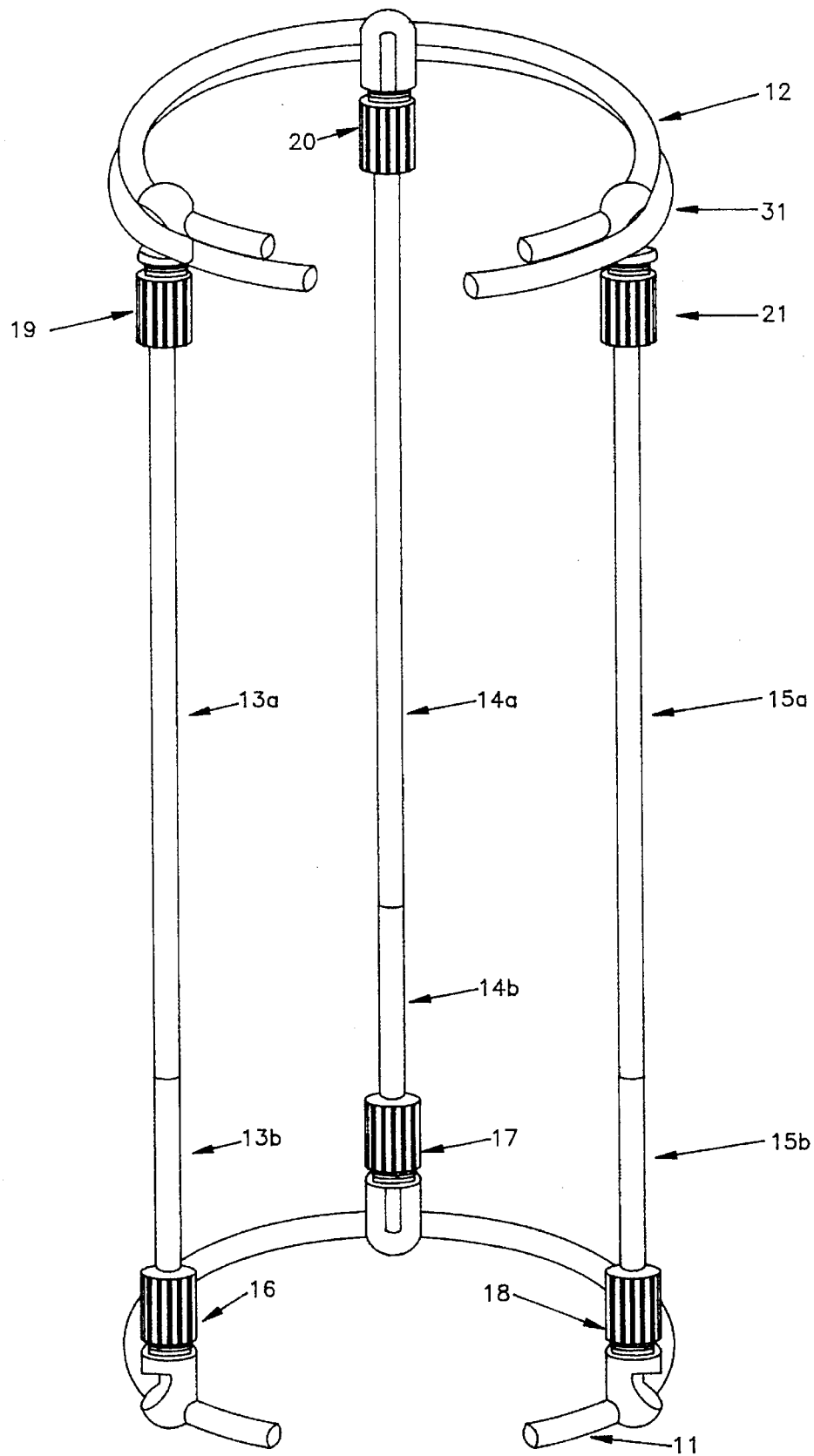
FIG. 4B is an isometric view of said frame with the locking ring installed on the couplings of the support ring.
Figure 4C:
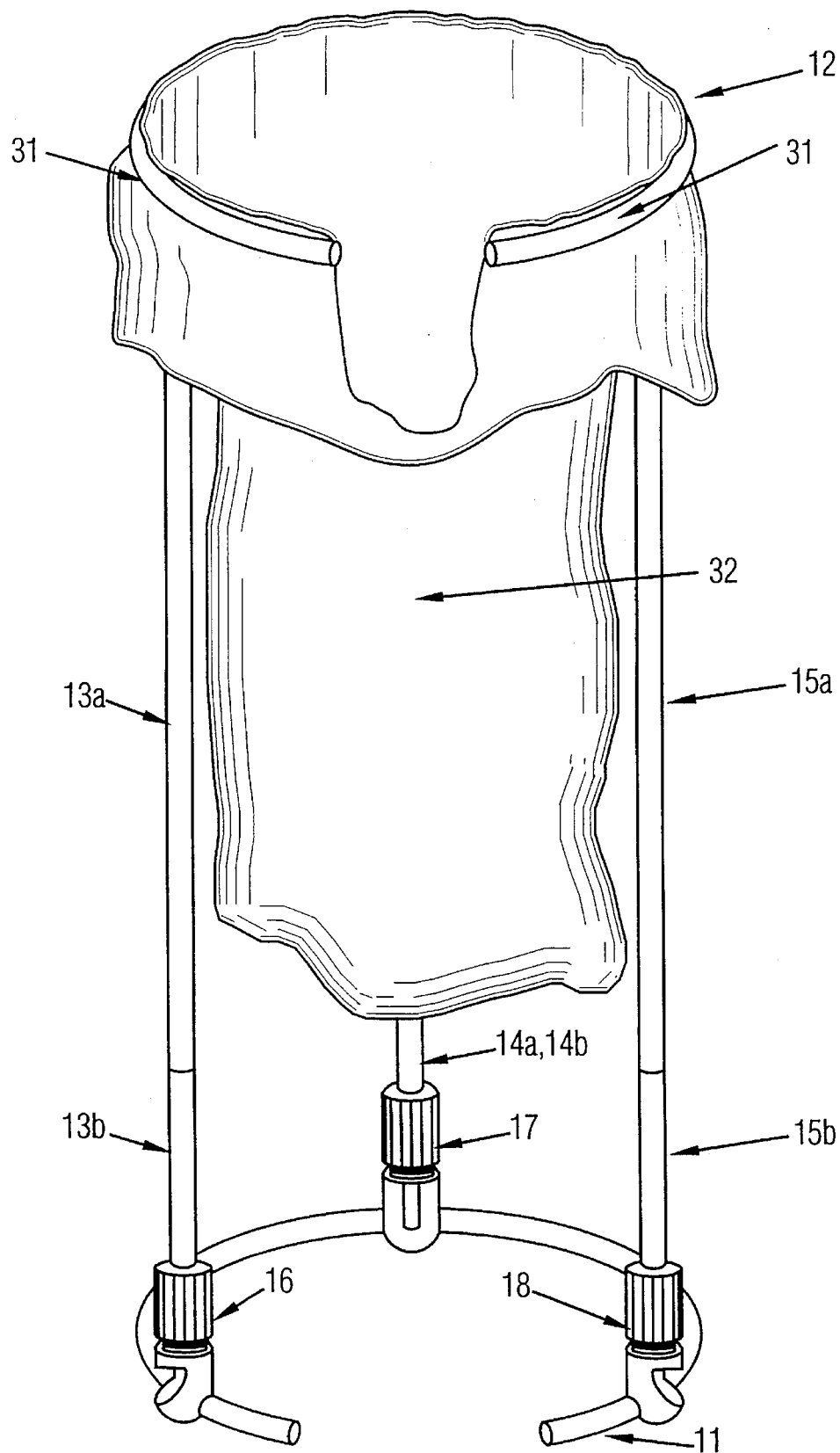
FIG. 4C is an isometric view of said frame with the locking ring installed on the couplings of the support ring so as to hold a plastic bag.

The support ring 12 is preferably circular; although if desired it may be horseshoe-shaped, with a major portion which is circular, i.e. the same shape as the locking ring 31 shown in FIG. 2B. As best seen in FIG. 4B, the length of the support ring 12 is somewhat less than the length of the locking ring 31.

The grooves 23d, 23e, 23f of the support ring 12 are dimensioned for receiving the removable open aluminum locking ring 31 (FIG. 2), which is preferably horseshoe-shaped, i.e. non-circular with a major portion which is circular, as shown in FIG. 2B, and preferably has a length somewhat greater than the length of the support ring 12.

The base, support and locking rings are formed of hollow tubing typically having an outer diameter of ½ in. and a wall thickness of about 0.03 in. The ends of said rings have plastic plugs therein with hemispherical surfaces protruding slightly from said ends so as to eliminate any risk of cutting the fingers or adjacent materials such as plastic bags when handling the rings, or installing or removing the locking ring.

The depth of the grooves 23d, 23e, 23f and the contour of the locking ring 31 are such that the locking ring, which is slightly resilient, tightly presses against the grooves when engaged therewith.

While the locking ring 31 may be snapped over the first end portions of the couplings 19, 20, 21 to engage it with the grooves 23d, 23e, 23f, preferably the locking ring is first positioned so that one end is adjacent one of said grooves; and rotated, i.e. slid, in a generally horizontal plane until the locking ring has engaged a groove of each of the three couplings.

It has been found that while a circular locking ring can be snapped over the couplings 19, 20, 21 for engagement with the grooves 23d, 23e, 23f, such a locking ring cannot readily or practicably be slid in a generally horizontal plane to engage said grooves. On the other hand, it has been found that when the locking ring 31 is horseshoe shaped, it can easily be slid in a generally horizontal plane for engagement with said grooves. Therefore the horseshoe shape of the locking ring 31 is preferred.

The preferred shape of the locking ring 31 is more precisely shown in FIG. 2B, wherein a major portion of the locking ring is circular with a radius R. A tangent line is perpendicular to the central radius line which bisects the opening of the ring. Each end of the ring is met by an opening-locating radius line which meets the central radius line at an angle $\alpha$ which is preferably approximately 30°. Thus the angle $\beta$ between the opening radius lines is $2\alpha$ or approximately 60°; and the angle $\gamma$ between each opening-locating radius line and the tangent is also approximately 60°. The dimension A corresponds to the length of the leg of each triangle formed by the central radius line, an opening-locating radius line, and the tangent, which is opposite the angle $\alpha$ of the corresponding triangle. The length of the opening of the locking ring is 2A. The dimension R is preferably about 1.8 times the dimension A.

In a preferred embodiment, the support ring 12 is circular, and the diameter of a circle upon which the bottoms of the grooves 23d, 23e, 23f of the couplings 19, 20, 21 lie is 1 ft. 2½ in. The outer diameter of the tubing which constitutes the support ring 12 and locking ring 31 is ½ in. The dimension 2R shown in FIG. 2B, i.e. the diameter of the circular major portion of the locking ring measured to its longitudinal axis, is 1 ft. 2½ in. The opening length 2A is 8 in. before the locking ring is engaged in the grooves 23d, 23e, 23f of couplings 19, 20, 21 of the support ring 12; and said opening length is approximately 8 ½ in. after the locking ring is installed thereon. The length of the locking ring 31 is about 3 in. greater than the length of the support ring 12.

To use the frame assembly, which comprises the frame 10 and locking ring 31, a plastic (or other material) bag 32 is positioned within the frame, with its closed lower end adjacent the base ring 11, and its open upper end draped over the support ring 12 and the couplings 19 to 21 thereof; after which the locking ring 31 is installed to engage the grooves 23d, 23e, 23f through portions of the bag, thus wedging said portions of the bag 32 between the locking ring 31 and the couplings 19, 20, 21 of the support ring 12, so as to retain the plastic bag in position.

When so held, a circumferential part of the open end of the plastic bag 32 hangs within the open part of the support ring 12, permitting the frame assembly to accommodate plastic bags of varying sizes and forming a lowered lip over which items may more easily be placed in the bag, especially by handicapped individuals.

To disassemble the frame, the nut parts of the couplings are unthreaded from the externally threaded portions of the first end parts of the couplings, and the rods are removed from the couplings. Thereafter the couplings are preferably rotated to positions in the plane of the corresponding rings, so as to minimize the height thereof, thus allowing all components of the frame assembly to be stored in a relatively small box.

Thus the frame assembly of the present invention is readily assembled and disassembled without any tools, and is easily transportable for use in locations away from home or office, such as picnics or the like.

The frame assembly of the present invention is especially useful as a portable receptacle to facilitate outdoor gathering of waste items such as papers, cans, trash and the like, so as to help preserve the environment.

Other embodiments of the invention may easily be designed and used, based on Aug. 31, 1994 the information set forth herein. Such embodiments may, for example, include:

a. The frame may be retained in position on the ground with a stake or other means which can be attached to the base ring or some other base in any form.

b. A cover may be attached in any form to the support ring.

c. A wheel or wheels may be attached in any form to the base ring.

d. A protective cover may be attached in any form to the base ring.

e. A hanger bracket may be attached in any form to the support ring or base ring.

f. Means other than a base ring and rods may be utilized to hold the support ring in position.

We claim:

1. A frame assembly for supporting plastic bags to be filled, comprising:

a lower horizontal base ring;

an upper horizontal open support ring;

a plurality of lower couplings mounted to said lower ring;

a plurality of upper couplings mounted to said support ring a plurality of vertical rods, each rod having a lower end engaging one of said lower couplings and an upper end engaging one of said upper couplings;

each of said upper couplings having an outwardly facing ring-receiving groove; and a removable open locking ring adapted to engage portions of the upper end of a plastic bag draped over said support ring and upper couplings thereof, to wedge said bag portions between the locking ring and upper couplings at the grooves thereof, so as to retain the plastic bag in position, wherein said locking ring is horseshoe shaped and a major portion of the locking ring is circular with a radius R, the ends of the locking ring defining a tangent Line which is (i) tangent to a circle a portion of which is coextensive with the circular portion of the locking ring, and (ii) perpendicular to a central radius line which goes through the center of the circular portion of the locking ring and bisects the opening of said locking ring, the center of the circular portion of the locking ring and each end of the locking ring defining an opening-locating radius line which meets the central radius line at an angle α, said opening-locating radius lines meeting at an angle β equal to 2α, each opening-locating radius line meeting the tangent line at an angle γ, each triangle formed by the central radius line, the opening-locating radius line, and the tangent line having a leg of length A opposite the angle α of the corresponding triangle, the length of the opening of the locking ring being 2A.

2. A frame assembly for supporting plastic bags to be filled, comprising:

a lower horizontal base ring;

an upper horizontal open circular support ring;

a plurality of lower couplings mounted to said lower ring;

a plurality of upper couplings mounted to said support ring a plurality of vertical rods, each rod having a lower end engaging one of said lower couplings and an upper end engaging one of said upper couplings;

each of said upper couplings having an outwardly facing ring-receiving groove; and a removable open locking ring adapted to engage portions of the upper end of a plastic bag draped over said support ring and upper couplings thereof, to wedge said bag portions between the locking ring and upper couplings at the grooves thereof, so as to retain the plastic bag in position, wherein said locking ring is horseshoe shaped and a major portion of the locking ring is circular with a radius R, the ends of the locking ring defining a tangent line which is (i) tangent to a circle a portion of which is coextensive with the circular portion of the locking ring, and (ii) perpendicular to a central radius line which goes through the center of the circular portion of the locking ring and bisects the opening of said locking ring, the center of the circular portion of the locking ring and each end of the locking ring defining an opening-locating radius line which meets the central radius line at an angle α, said opening-locating radius lines meeting at an angle β equal to 2α, each opening-locating radius line meeting the tangent line at an angle γ, each triangle formed by the central radius line, the opening-locating radius line, and the tangent line having a leg of length A opposite the angle α of the corresponding triangle, the length of the opening of the locking ring being 2A.

3. A frame assembly for supporting plastic bags to be filled, comprising:

a lower horizontal base ring;

an upper horizontal open horseshoe shaped support ring;

a plurality of lower couplings mounted to said lower ring;

a plurality of upper couplings mounted to said support ring a plurality of vertical rods, each rod having a lower end engaging one of said lower couplings and an upper end engaging one of said upper couplings;

each of said upper couplings having an outwardly facing ring-receiving groove; and a removable open locking ring adapted to engage portions of the upper end of a plastic bag draped over said support ring and upper couplings thereof, to wedge said bag portions between the locking ring and upper couplings at the grooves thereof, so as to retain the plastic bag in position, wherein said locking ring is horseshoe shaped and a major portion of the locking ring is circular with a radius R, the ends of the locking ring defining a tangent line which is (i) tangent to a circle a portion of which is coextensive with the circular portion of the locking ring, and (ii) perpendicular to a central radius line which goes through the center of the circular portion of the locking ring and bisects the opening of said locking ring, the center of the circular portion of the locking ring and each end of the locking ring defining an opening-locating radius line which meets the central radius line at an angle α, said opening-locating radius lines meeting at an angle β equal to 2α, each opening-locating radius line meeting the tangent line at an angle γ, each triangle formed by the central radius line, the opening-locating radius line, and the tangent line having a leg of length A opposite the angle α of the corresponding triangle, the length of the opening of the locking ring being 2A.

4. The frame assembly according to claim 1, 2, or 3, wherein the angle α is approximately 30° and the angles β and γ are approximately 60°.

5. The frame assembly according to claim 4, wherein the dimension R is approximately 1.8 times the dimension A.

6. The frame assembly according to claim 1, 2, or 3, wherein the dimension R is approximately 1.8 times the dimension A.

7. The frame assembly according to claim 6, wherein said locking ring is somewhat longer than said support ring.

8. A frame assembly for supporting bags to be filled, comprising:

an open support ring;

support means for supporting said support ring;

at least one ring-receiving member mounted to said support ring and having an outwardly facing ring-receiving groove; and an open locking ring adapted to engage a portion of a bag between the locking ring and ring-receiving members at the groove thereof, so as to retain the bag in position, wherein said locking ring is horseshoe shaped and a major portion of the locking ring is circular with a radius R, the ends of the locking ring defining a tangent line which is (i) tangent to a circle a portion of which is coextensive with the circular portion of the locking ring, and (ii) perpendicular to a central radius line which goes through the center of the circular portion of the locking ring and bisects the opening of said locking ring, the center of the circular portion of the locking ring and each end of the locking ring defining an opening-locating radius line which meets the central radius line at an angle α, said opening-locating radius lines meeting at an angle β equal to 2α, each opening-locating radius line meeting the tangent line at an angle γ, each triangle formed by the central radius line, the opening-locating radius line, and the tangent line having a leg of length A opposite the angle α of the corresponding triangle, the length of the opening of the locking ring being 2A, the dimension R being approximately 1.8 times the dimension A.

9. A frame assembly for supporting plastic bags to be filled, comprising:

a lower horizontal base ring;

an upper horizontal open support ring;

a plurality of rotatable lower couplings mounted to said lower ring;

a plurality of rotatable upper couplings mounted to said support ring, each of said lower and upper couplings comprising a threaded pressure fitting;

a plurality of vertical rods, each rod having a lower end engaging one of said lower couplings and an upper end engaging one of said upper couplings;

each of said upper couplings having an outwardly facing ring-receiving groove; and a removable open horseshoe shaped locking ring somewhat longer than said support ring and adapted to engage portions of the upper end of a plastic bag draped over said support ring and upper couplings thereof, to wedge said bag portions between the locking ring and upper couplings at the grooves thereof, so as to retain the plastic bag in position, wherein a major portion of the locking ring is circular with a radius R, the ends of the locking ring defining a tangent line which is (i) tangent to a circle a portion of which is coextensive with the circular portion of the locking ring, and (ii) perpendicular to a central radius line which goes through the center of the circular portion of the locking ring and bisects the opening of said locking ring, the center of the circular portion of the locking ring and each end of the locking ring defining an opening-locating radius line which meets the central radius line at an angle α, said opening-locating radius lines meeting at an angle β equal to 2α, each opening-locating radius line meeting the tangent line at an angle γ, each triangle formed by the central radius line, the opening-locating radius line, and the tangent line having a leg of length A opposite the angle α of the corresponding triangle, the length of the opening of the locking ring being 2A, the dimension R being approximately 1.8 times the dimension A.

10. The frame assembly according to claim 8 or 9, wherein the angle α is approximately 30° and the angle β and γ are approximately 60°.

11. A frame assembly for supporting plastic bags to be filled, comprising:

a lower horizontal base ring;

an upper horizontal open support ring;

a plurality of rotatable lower couplings mounted to said lower ring;

a plurality of rotatable upper couplings mounted to said support ring, each of said lower and upper couplings comprising a threaded pressure fitting;

a plurality of vertical rods, each rod having a lower end engaging one of said lower couplings and an upper end engaging one of said upper couplings;

each of said upper couplings having an outwardly facing ring-receiving groove; and a removable open horseshoe shaped locking ring somewhat longer than said support ring and adapted to engage portions of the upper end of a plastic bag draped over said support ring and upper couplings thereof, to wedge said bag portions between the locking ring and upper couplings at the grooves thereof, so as to retain the plastic bag in position, wherein a major portion of the locking ring is circular with a radius R, the ends of the locking ring defining a tangent line which is (i) tangent to a circle a portion of which is coextensive with the circular portion of the locking ring, and (ii) perpendicular to a central radius line which goes through the center of the circular portion of the locking ring and bisects the opening of said locking ring, the center of the circular portion of the locking ring and each end of the locking ring defining an opening-locating radius line which meets the central radius line at an angle α, said opening-locating radius lines meeting at an angle β equal to 2α, each opening-locating radius line meeting the tangent line at an angle γ, each triangle formed by the central radius line, the opening-locating radius line, and the tangent line having a leg of length A opposite the angle α of the corresponding triangle, the length of the opening of the locking ring being 2A.

12. The frame assembly according to claim 11, wherein the dimension R is approximately 1.8 times the dimension A.

* * * * *